United States Patent

Williams et al.

[11] Patent Number: 5,909,442
[45] Date of Patent: *Jun. 1, 1999

[54] INTELLIGENT NETWORK ACCESS TO OBSCURE AND REMOTE SERVICES

[75] Inventors: Philip John Williams, Brislington; Keith Patrick Jones, Earlsdon, both of United Kingdom

[73] Assignee: GPT Limited, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/584,734

[22] Filed: Jan. 11, 1996

[51] Int. Cl.$^6$ ................................................. H04L 12/66
[52] U.S. Cl. ........................... 370/401; 370/410; 370/411
[58] Field of Search ................................. 370/389, 351, 370/401, 406, 408, 411, 252, 392, 400, 402, 403, 404, 405, 410, 522, 475; 340/825.06, 825.07; 395/200.33, 200.57, 200.68, 200.75

[56] References Cited

U.S. PATENT DOCUMENTS

| | | | |
|---|---|---|---|
| 4,797,880 | 1/1989 | Bussey, Jr. et al. | 370/392 |
| 4,891,803 | 1/1990 | Huang et al. | 370/411 |
| 5,371,852 | 12/1994 | Attanasio et al. | 395/200 |
| 5,412,654 | 5/1995 | Perkins | 455/11.1 |

*Primary Examiner*—Chi H. Pham
*Assistant Examiner*—Ricky Ngo
*Attorney, Agent, or Firm*—Kirschstein, et al.

[57] ABSTRACT

Using a known Intelligent Network Architecture a service invocation message is addressed via a Sorter to an appropriate Server. After interrogating the caller when necessary, the Server may re-address the message directly to another Server within the same organization or consortium, which may in turn repeat the process. Thereby a Service Provider representing a large business organization or consortium offers a single umbrella service and is able to introduce new services or sources of information, and to cease, re-configure or resituate the existing services with no effect whatever upon public network or message network equipment.

6 Claims, 2 Drawing Sheets

LEGEND:

--->--- DENOTES MESSAGE-ONLY AND DIRECTION.

— > — DENOTES CALL AND DIRECTION OF ESTABLISHMENT

--->--- SERVICE INVOCATION MESSAGE

-/-<-/- ENQUIRY CALL (RELEASED BY SERVICE DELIVERY CALL)

—<— SERVICE DELIVERY CALL

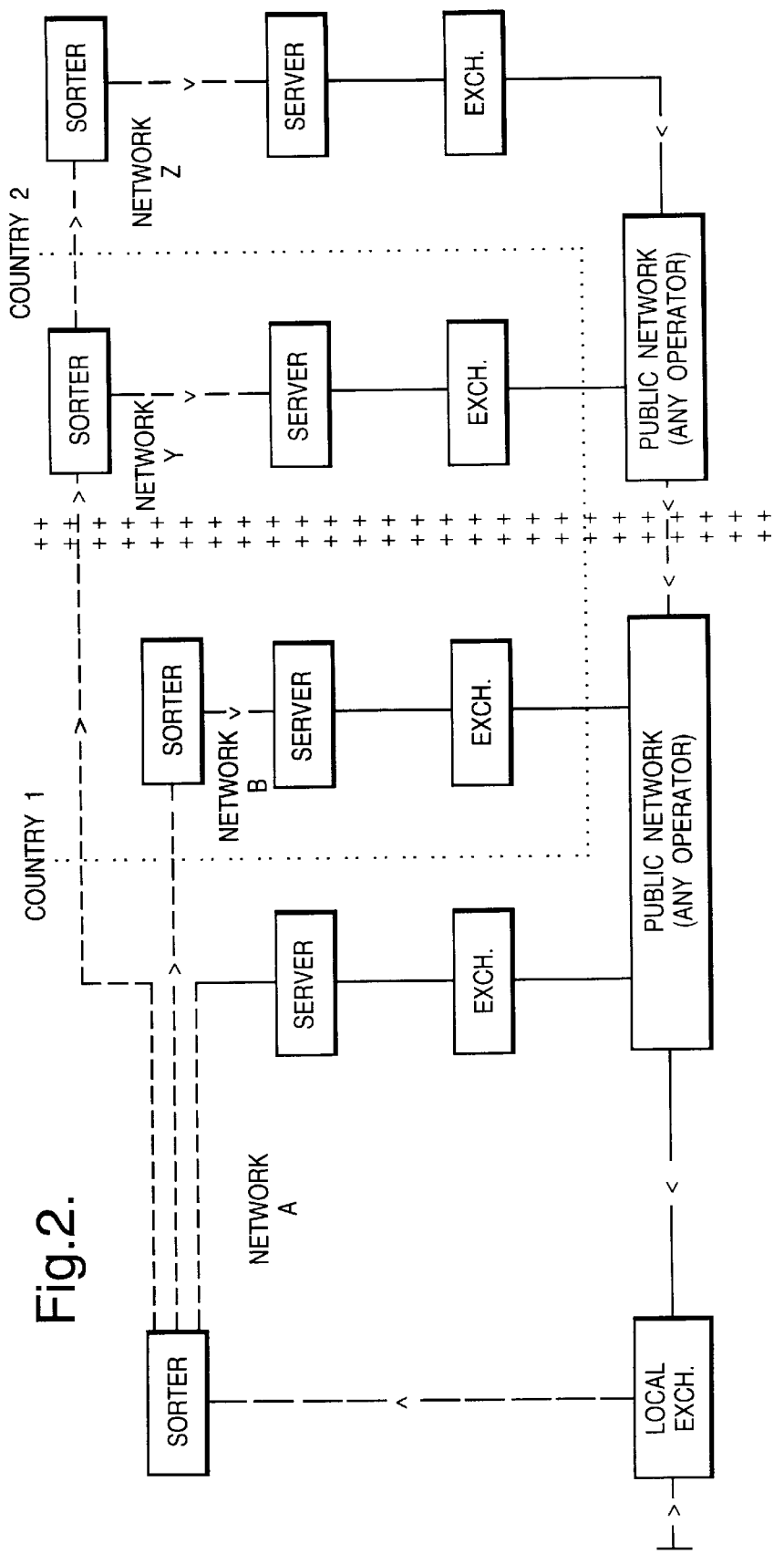

INTELLIGENT NETWORK ACCESS TO OBSCURE AND REMOTE SERVICES

FIELD OF THE INVENTION

Background of the Invention

An Alternative Intelligent Network Architecture, also referred to as an Enhanced Intelligent Network was described in patent application No. GB2272603A imported herein by reference.

The Enhanced Intelligent Network (I.N.) architecture is illustrated in FIG. 1, and outlined below.

To invoke an Enhanced I.N. service, a local exchange extends a standard invocation message via an I.N. message network addressed to the nearest Sorter. The message contains the caller's identity (CLI) and classification, the digits dialled by the caller to request an I.N. service and a call-reference identifying the call within the local exchange.

The Sorter opens the message to identify the service required and uses a look-up table to re-address the message to the appropriate Server. Routers are the nodes of the message network; they forward messages to the addressed destination.

Upon receiving the message, the Server delivers the service by picking-up the caller via the public network using the CLI, call-reference and the IN-override facility which enables connection to the off-hook subscriber.

Later, the Server may transfer the call to another Server by amending the original invocation message and returning it to the message network addressed directly to the new Server or via the nearest Sorter as before. Such invocation messages will often include an appendage.

Servers thus provide all of the intelligence and complexity required to deliver the services. The only other intelligence employed is that which enables the Sorter to identify the address of the Server.

Forwarding invocation messages to services provided in other networks or other countries, using the method of FIG. 1, would require that Sorters were able to identify the location of Servers in other networks or other countries, which would in turn require internetwork and international management of Sorters.

The means of avoiding the need for internetwork and international Sorter management is illustrated in FIG. 2 and FIG. 3 and outlined below.

When a Sorter is required to re-address an invocation message to a service provided in another network, it simply re-addresses the message to a Sorter in that network. Similarly when a service is provided in another country, the Sorter re-addresses the message to a Sorter in that country, it does not matter that the country may include many networks.

Thus, the code dialled to gain access to a service provided in another country, will be prefixed to identify the country. Within a country, the network in which a service is provided will probably be identified by the allocation of blocks within a common numbering scheme rather than by the use of prefix digits.

SUMMARY OF THE INVENTION

According to the present invention there is provided an Intelligent Network having a plurality of Servers, at least one Sorter wherein a service invocation message from a subscriber is addressed via the Sorter to a one of the plurality of Servers and re-addressed by the one Server directly to another of the plurality of Servers.

BRIEF DESCRIPTION OF THE DRAWINGS

The present invention will now be described by way of example, with reference to the accompanying drawings, in which:

FIG. 2 shows a schematic representation of the means by which an Intelligent Network enables internetwork and international service delivery.

DESCRIPTION OF THE INVENTION

Figure 1:
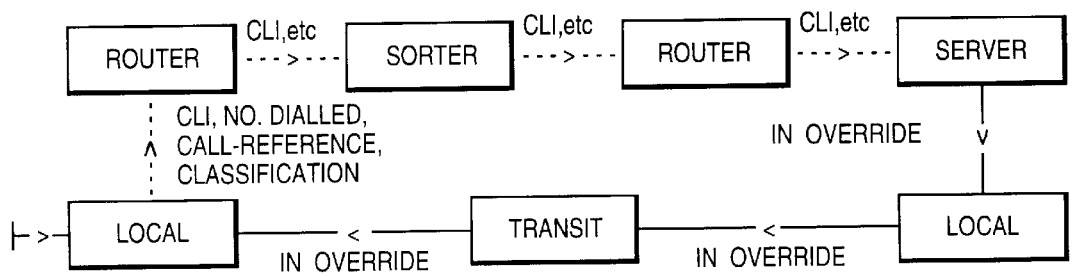
FIG. 1 shows a schematic representation of a prior art Intelligent Network.
Figure 3:
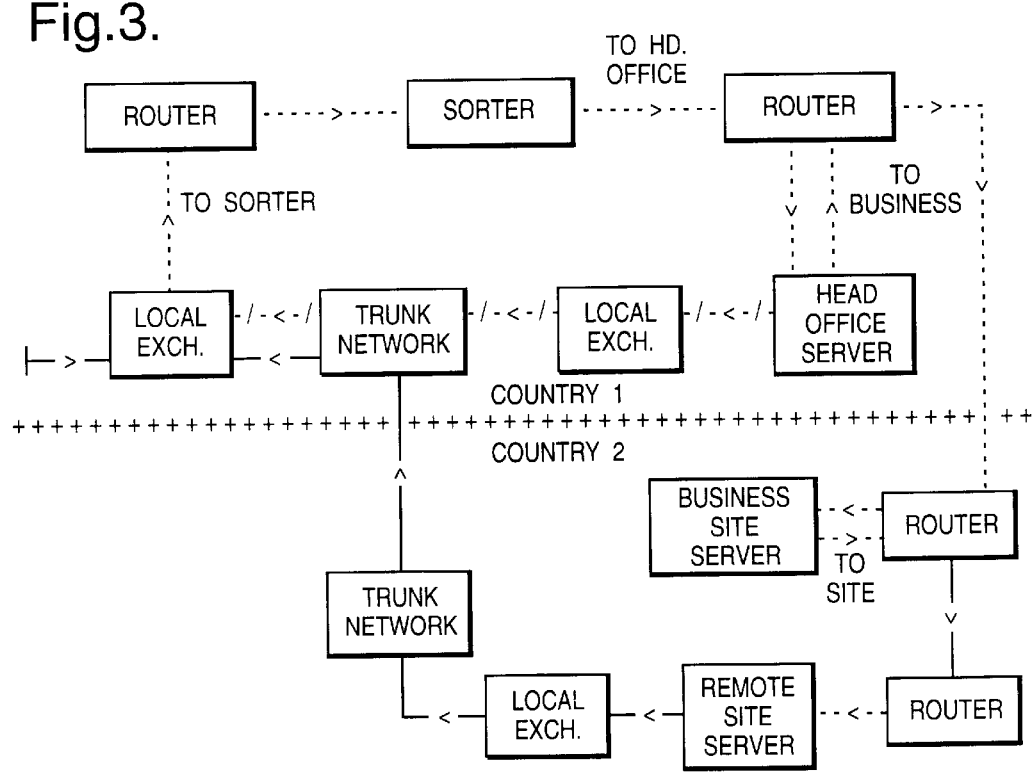
FIG. 3 shows a schematic representation of a system such as is shown in FIGS. 1 and 2 which enables access to a variety of services and information provided as a single service by a large business organization or consortium.

A large business organization or consortium may require a single directory number or service code to provide access to any Server within the organization thereby enabling access to the complete range of services. Some services will be available to the general public while other services or sources of information will be restricted to agents or employees. The fact that the Server delivers the service to the caller's directory number guarantees the security of proprietary information.

Each service or source of information will be delivered from the site at which the business is handled or the information resides. The source of different services and information may thus be spread around many sites and many countries.

To gain access to such services and information, Sorters will address all service invocation messages to the Server at the Service Provider's head office or regional depot. This Server may deliver some services but will re-address most of the messages to Servers at the relevant businesses, which may in turn re-address some of the messages to another site.

Any or all of these re-addressing actions may cross national or network boundaries and may include picking-up and interrogating the caller. Having interrogated the caller, the invocation message will usually include an appendage. (A call established to interrogate a caller will be released when the caller is picked-up by another Server for interrogation or to deliver the service.)

Service Providers may thus extend their range of services at will, with no effect whatever upon public network or message network equipment. When Servers are provided at a new location the Service Provider needs only to notify his existing Servers of the new Server's message network address and the new services available.

The advantage of this simple re-addressing process is that even the most obscure and fluid information is easily accessible. When the Service Provider or one of his subordinates has located the required service or information, it will appear at a public network terminal somewhere in the world and establish a connection to the caller.

Public networks are as a result not required to allocate directory numbers to every facet of obscure services and fleeting sources of information, as would be required if connections to services were to be established in the conventional forward manner.

What we claim is:

1. In an intelligent network system in which a local exchange transmits a service invocation message to a first intelligent network having a first sorter for identifying an intelligent network service requested by the message, and a first server addressable by the first sorter for delivering the intelligent network service to the local exchange, an arrangement for delivering the intelligent network service from a second intelligent network connected to the first network, the arrangement comprising:

a) a second sorter in the second network and operatively connected to the first sorter;

b) a second server in the second network and operatively connected to the second sorter; and c) means associated with the first sorter, for addressing the message received from the local exchange to the second sorter which, in turn, re-addresses the message to the second server for delivering the intelligent network service from the second network to the local exchange.

2. The arrangement as claimed in claim 1, wherein the first and second networks are located in a single country.

3. The arrangement as claimed in claim 1, wherein the first and second networks are located in different countries.

4. The arrangement as claimed in claim 1, wherein the first and second networks are operated by a single user.

5. The arrangement as claimed in claim 1, wherein the second server is connected to a public network which is connected to the local exchange.

6. The arrangement as claimed in claim 1, wherein the intelligent networks of the intelligent network system are operated under an international standard signaling protocol known as CCITT, Signaling System No. 7.

* * * * *